United States Patent [19]

Hwang

[11] Patent Number: 4,704,542
[45] Date of Patent: Nov. 3, 1987

[54] STANDBY POWER SUPPLY

[75] Inventor: Mau-Choung P. Hwang, Indianapolis, Ind.

[73] Assignee: RCA Corporation, Princeton, N.J.

[21] Appl. No.: 713,954

[22] Filed: Mar. 22, 1985

[51] Int. Cl.[4] ............................................. H02J 7/00
[52] U.S. Cl. ........................................ 307/66; 320/13
[58] Field of Search ...................... 307/66, 64, 43, 46, 307/48–51, 84–87; 320/2, DIG. 1, 13, 39, 40; 323/284, 273

[56] References Cited

U.S. PATENT DOCUMENTS

| 2,534,542 | 12/1950 | Bower | 307/64 |
|---|---|---|---|
| 3,257,603 | 6/1966 | Laube | 307/66 |
| 3,319,074 | 5/1967 | Koch | 307/66 |
| 3,395,288 | 7/1968 | Brimer | 320/40 X |
| 3,573,483 | 4/1971 | White | 307/66 |
| 3,710,134 | 1/1973 | Guthart | 307/66 |
| 3,939,359 | 2/1976 | Nehushtan et al. | 307/66 |
| 4,150,302 | 4/1979 | Roche | 307/66 |
| 4,544,910 | 10/1985 | Hoberman | 307/66 X |
| 4,563,628 | 1/1986 | Tietz et al. | 307/66 X |
| 4,571,531 | 2/1986 | Lin | 307/66 X |

FOREIGN PATENT DOCUMENTS

| 0076578 | 6/1980 | Japan | 320/13 |
|---|---|---|---|
| 311478 | 8/1971 | U.S.S.R. | 320/DIG. 1 |
| 0698081 | 11/1979 | U.S.S.R. | 320/13 |

OTHER PUBLICATIONS

*Popular Electronics*, "Hobby Scene: Remote Battery Cutoff" Jan. 1974.

Primary Examiner—William M. Shoop, Jr.
Assistant Examiner—Sharon D. Logan

[57] ABSTRACT

A standby power supply arrangement comprises a transistor with its emitter coupled to one pole of a standby battery and its collector coupled to a load. The transistor base is coupled to the other pole of the battery by way of a threshold device. When the battery voltage falls below a given limit, the threshold device no longer conducts, causing the transistor to cease to conduct power to the load.

15 Claims, 1 Drawing Figure

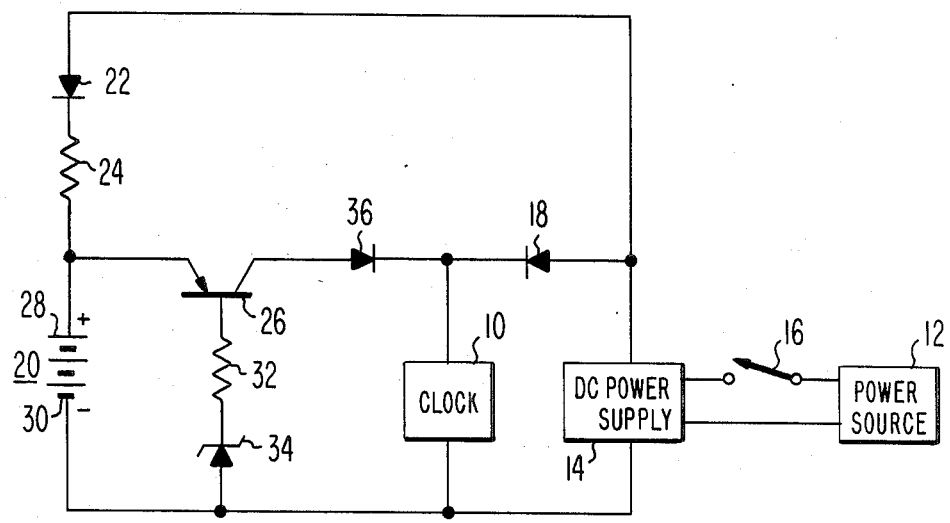

STANDBY POWER SUPPLY

The present invention relates to the field of standby electric power supplies, particularly such as include a standby battery source.

In certain kinds of electrical equipment and appliances, it may be desirable that the power supply to a particular circuit portion be continuously maintained. For example, the equipment may incorporate a clock in which loss of power would result in a loss of time-keeping. A volatile memory, such as may be incorporated in a television receiver to store a programmed channel list, would lose its stored content when a power loss occurs. Mains power line operated equipment is subject to a loss of power supply, for example, when the power supply cord is unplugged from the power outlet or during a service interruption or power outage.

A battery can provide a convenient standby power source during a temporary loss of mains power. Typically, a small maintaining or "trickle" charge is supplied to the battery during times when mains power is available so as to keep it adequately charged. Standby power can then be provided for some period of time depending on the rated battery capacity available.

However, the duration of a mains power outage may continue beyond the rated capacity of the battery to provide standby power. Nevertheless, the load circuit may continue to drain power from the battery until it has been excessively discharged. Such excessive discharging tends to cause an irreversible amount of damage in a typical battery. The battery may then no longer be able to retain a charge and needs replacement.

Manufacturers of mains power line operated equipment generally prefer to avoid provisions for user access to the internal parts of such equipment, as might be the case when battery replacement is required. Consequently, battery replacement may require the attention of service personnel, which can be expensive. The service call expense is particularly high when a house call is required for service, such as might occur, for example, when battery replacement is required for a clock incorporated in a large, heavy television receiver console. Furthermore, battery installation generally cannot be completed in a subassembly plant, for example, since subassembly units typically spend a period of time in storage and transporation during which excessive battery discharge may occur. Battery installation in a final assembly plant tends to be more expensive and is therefore less desirable.

In accordance with an aspect of the invention, the emitter electrode of a transistor arrangement is coupled to a first pole of a battery and the collector electrode is coupled to the load. The base electrode of the transistor arrangement is coupled to a second pole of the battery by way of a threshold arrangement. The threshold arrangement is substantially conductive when the potential difference across it exceeds a predetermined threshold level.

In accordance with a further aspect of the invention, the threshold arrangement exhibits substantially lower conductivity when the potential difference across it is less than the predetermined threshold level.

The SOLE FIGURE shows partly in circuit schematic form and partly in block diagram form a standby power supply constructed in accordance with the present invention.

An electric clock 10 normally receives operating power from a regular power source 12, which may, for example, be an alternating current (AC) power source. Power from power source 12 is converted by a direct current (DC) power supply 14 into a DC supply for clock 10. An on/off switch 16 selectively interrupts the AC supply to DC power supply 14 and thereby causes the cessation of DC supply voltage. Interruption of AC power due for example, a power outage will also cause the cessation of DC supply voltage.

DC power supply 14 is coupled to clock 10 by way of a diode 18, poled for forward conduction during normal operation of DC power supply 14. When AC power is lost, such as by switch 16 being opened, diode 18 becomes reverse biased, thus effectively disconnecting DC power supply 14 from clock 10 so that it does not load battery 20.

Standby power is provided by a battery 20, which is kept adequately charged by a trickle current supplied from DC power supply 14 by way of a diode 22 in series with a current limiting resistor 24.

A transistor 26, here shown as a PNP transistor, has its emitter coupled to the positive pole 28 of battery 20 and its base coupled to the negative pole 30 by way of a resistor 32 in series with a Zener or avalanche diode 34. Zener diode 34 may advantageously be realized in the form of a reverse-biased transistor emitter-base junction. Such junctions typically exhibit relatively low leakage current below the point of substantial conduction. The collector of transistor 26 is coupled to clock 10 by way of a diode 36. During normal operation from the AC power line, diode 36 is reverse biased by the DC voltage applied to its cathode from DC power supply 14 and the collector current of transistor 26 is negligibly small.

When AC power is lost, standby power is supplied to clock 10 by battery 20. The normal voltage of battery 20 is sufficient to forward bias the emitter base junction of transistor 26 and to cause its base current to bias Zener diode 34 into conduction in its characteristic operating region of relatively constant voltage drop. A certain voltage drop also appears across resistor 32, which serves to limit the current through Zener diode 34. The collector current of transistor 26 flows into clock 10 by way of diode 36. As explained, diode 18 effectively decouples DC power supply 14 from clock 10 when AC power is lost.

So long as the AC power remains off, battery 20 continues to supply standby power to clock 10, although its terminal voltage will gradually tend to drop as it becomes more discharged. As the battery terminal voltage drops, the voltage drop across resistor 32 will drop by substantially the same amount, at first. This can be explained as follows. The sum of the emitter-base voltage of transistor 26, the Zener diode voltage drop and the drop across resistor 32 are equal to the battery voltage, since these elements are in series between the battery terminals. Both the emitter-base voltage and the Zener diode voltage remain substantially constant until the current through them becomes very small. Therefore, up to that point, only the drop across resistor 32 can be reduced substantially to accomodate the reduction in battery voltage. Thus, as the battery voltage continues to drop, the base current for transistor 26 continues to flow through resistor 32 and Zener diode 34, until at a predefined point, the Zener diode current falls below the critical value required to maintain the constant Zener diode voltage. At that point, transistor 26 base current drops substantially to zero, causing the collector current also to cease flowing. Thus, the emitter current becomes substantially zero and battery 20 is effectively uncoupled from the circuit and experiences substantially no current drain at all. This cut-off point occurs at the battery discharge level at which the discharging must stop to safeguard the battery from damage. In addition to battery protection, a further advantage is realized in that the battery can be installed in a subassembly plant instead of in final assembly, without concern that excessive discharge may occur during a period of storage and transportation.

The implementation of the invention in accordance with the FIGURE is illustrative. For example, while a clock has been used by way of example, clearly other kinds of appliances or equipment may be supplied standby power in accordance with the invention. Furthermore, although the illustrative embodiment utilizes a bipolar transistor, a field effect transistor (FET) could be substituted, with the provision of a resistance between the FET source and gate to provide the Zener diode with current. Such modifications are contemplated to be within the scope of the present invention which is defined by the following claims.

What is claimed is:

1. An arrangement including battery means having first and second poles for providing standby operating power to a load means, wherein regular operating power is provided to said load means by a regular power supply subject to interruption, said arrangement comprising:
   transistor means including emitter, base and collector electrodes, said emitter electrode being coupled to said first pole of said battery means and said collector electrode being coupled to said load means; and
   threshold means coupled between said base electrode and said second pole of said battery means, said threshold means being responsive solely to the potential difference between said base electrode and said second pole of said battery means so as to be substantially conductive when the potential difference thereacross exceeds a predetermined threshold level for causing current to flow in said base electrode so as to bias said transistor means for conduction when the potential difference between said base electrode and said second pole of said battery means exceeds said predetermined threshold level such that, when said threshold means is conductive, the entire current that flows therein is supplied by said current that flows in said base electrode, said threshold means exhibiting substantially lower conductivity when said potential difference is less than said predetermined threshold level for causing current flow in said base electrode to substantially cease for biasing said transistor for substantial non-conduction when the potential difference between said base electrode and said second pole of said battery means is less than said predetermined threshold.

2. The arrangement recited in claim 1 wherein said threshold means comprises Zener diode means.

3. The arrangement recited in claim 2 wherein said Zener diode means comprises a resistance in series with a Zener diode.

4. The arrangement recited in claim 3 wherein said transistor means is of a polarity tpye such that the emitter-base junction is forward-biased into conduction by current flowing through said threshold means.

5. The arrangement recited in claim 1 wherein said threshold means comprises a further transistor, the emitter-base junction of said further transistor being coupled between said base electrode and said second pole of said battery means for being reverse-biased when said transistor means conducts current.

6. The arrangement recited in claim 5 wherein said threshold means comprises resistance means in series with said emitter-base junction.

7. The arrangement recited in claim 6 wherein said transistor means is of a polarity type such that the emitter-base junction is forward-biased into conduction by current flowing through said threshold means.

8. An arrangement including battery means having first and second poles for providing standby operating power to a load means, wherein regular operating power is provided to said load means by a regular power supply subject to interruption, said arrangement comprising:
   diode means;
   transistor means including emitter, base and collector electrodes, said emitter electrode being coupled to said first pole of said battery means and said collector electrode being coupled to said load means by way of said diode means; and
   threshold means that comprises a resistance in series with a zener diode coupled between said base electrode and said second pole of said battery means, said threshold means being responsive solely to the potential difference between said base electrode and said second pole of said battery means so as to be substantially conductive when the potential difference thereacross exceeds a predetermined threshold level for causing current to flow in said base electrode so as to bias said transistor means for conduction when the potential difference between said base electrode and said second pole of said battery means exceeds said predetermined threshold level and said threshold means exhibiting substantially lower conductivity when said potential difference is less than said predetermined threshold level for causing current flow in said base electrode to substantially cease for biasing said transistor for substantial non-conduction when the potential difference between said base electrode and said second pole of said battery means is less than said predetermined threshold.

9. The arrangement recited in claim 8 wherein said battery means is further coupled to said regular power supply by means for providing a charging current to said battery means.

10. The arrangement recited in claim 8 wherein said regular power supply is coupled to said load means by way of a further diode means.

11. An arrangement including battery means having first and second poles for providing standby operating power to a load means, wherein regular operating power is provided to said load means by a regular power supply subject to interruption, said arrangement comprising:
   diode means;
   transistor means including emitter, base, and collector electrodes, said emitter electrode being coupled to said first pole of said battery means, and said collector electrode being coupled to said load means by way of said diode means; and
   threshold means coupled between said base electrode and said second pole of said battery means, said threshold means comprising a further transistor and a resistance coupled in series with the emitter-base junction of said further transistor, the emitter-base junction of said further transistor being reversed-biased when said transistor means conducts current, said threshold means being responsive solely to the potential difference between said base electrode and said second pole of said battery means so as to be substantially conductive when the potential difference thereacross exceeds a predetermined threshold level for causing current to flow in said base electrode of said transistor means so as to bias said transistor means for conduction when the potential difference between said base electrode of said transistor means and said second pole of said battery means exceeds said predetermined threshold level and said threshold means exhibiting substantially lower conductivity when said potential difference is less than said predetermined threshold level for causing current flow in said base electrode of said transistor means to substantially cease for biasing said transistor means for substantial non-conduction when the potential difference between said base electrode of said transistor means and said second pole of said battery means is less than said predetermined threshold.

12. The arrangement recited in claim 11 wherein said battery means is further coupled to said regular power supply by means for providing a charging current to said battery means.

13. The arrangement recited in claim 12 wherein said regular power supply is coupled to said load means by way of a further diode means.

14. An arrangement including battery means having first and second poles for providing standby operating power to a load means, wherein regular operating power is provided to said load means by a regular power supply subject to interruption, said arrangement comprising:
   transistor means including emitter, base, and collector electrodes, said emitter electrode being coupled to said first pole of said battery means;
   first diode means having anode and cathode electrodes and being coupled between said collector electrode and said load means;
   second diode means having anode and cathode electrodes and being coupled between said regular power supply and said load means; and
   threshold means coupled between said base electrode and said second pole of said battery means, said threshold means being responsive solely to the potential difference between said base electrode and said second pole of said battery means so as to be substantially conductive when the potential difference thereacross exceeds a predetermined threshold level.

15. The arrangement recited in Claim 14 wherein said anodes of said first and second diode means are both coupled to one of said collector electrode and said load means.

* * * * *